United States Patent
Maddelein et al.

(10) Patent No.: US 11,993,225 B2
(45) Date of Patent: May 28, 2024

(54) HANDLELESS DOOR FOR VEHICLE

(71) Applicant: Inteva Products France SAS, Sully sur Loire (FR)

(72) Inventors: Michael Maddelein, Northville, MI (US); Jean-Marc Belmond, Saint Jean le Blanc (FR); Pascal Philippe, Saulcy/Meurthe (FR); Pascal Bonduel, Bouzy la Forêt (FR)

(73) Assignee: INTEVA FRANCE, Sully sur Loire (FR)

( * ) Notice: Subject to any disclaimer, the term of this patent is extended or adjusted under 35 U.S.C. 154(b) by 351 days.

(21) Appl. No.: 17/431,398

(22) PCT Filed: Feb. 14, 2020

(86) PCT No.: PCT/IB2020/000129
§ 371 (c)(1),
(2) Date: Aug. 16, 2021

(87) PCT Pub. No.: WO2020/165652
PCT Pub. Date: Aug. 20, 2020

(65) Prior Publication Data
US 2022/0144207 A1    May 12, 2022

Related U.S. Application Data

(63) Continuation of application No. 16/277,308, filed on Feb. 15, 2019, now abandoned.

(30) Foreign Application Priority Data

Feb. 20, 2019    (FR) ..................................... 1901700

(51) Int. Cl.
*B60R 25/01*    (2013.01)
*B60R 25/24*    (2013.01)
(Continued)

(52) U.S. Cl.
CPC .............. *B60R 25/01* (2013.01); *B60R 25/24* (2013.01); *E05B 81/78* (2013.01); *E05F 15/76* (2015.01); *B60J 5/04* (2013.01); *E05Y 2900/531* (2013.01)

(58) Field of Classification Search
CPC ......... B60R 25/01; B60R 25/24; E05B 81/78; E05B 81/77
See application file for complete search history.

(56) References Cited

U.S. PATENT DOCUMENTS 10,087,671 B2    10/2018    Linden et al.
2003/0001724 A1    1/2003    Willats et al.
(Continued)

FOREIGN PATENT DOCUMENTS

| CN | 107687299 A | 2/2018 |
| WO | 2008083957 A2 | 7/2008 |
| WO | 2018054884 A1 | 3/2018 |

OTHER PUBLICATIONS

French Written Opinion for French Application No. 19/01700 dated Feb. 20, 2019, 14 Pages.
(Continued)

*Primary Examiner* — Nabil H Syed
(74) *Attorney, Agent, or Firm* — CANTOR COLBURN LLP

(57) ABSTRACT

A system for operating a handleless door of an automobile having an outer surface includes a remotely-controlled door latch, a sensor disposed at at least one of: disposed behind a window seal; assembled on the window seal; and overmolded in the window seal, and configured to sense an input from a user to open the door, the window seal being configured to transmit an input force to the sensor, and an antenna configured to receive a radio signal from a key fob in vicinity of the antenna. The system also includes a passive entry passive start (PEPS) system coupled to the antenna to
(Continued)

authenticate the key fob as being associated with the automobile and a controller configured to receive a signal from the sensor indicating the user provided input to open the door, receive an authentication signal from the PEPS system to authenticate the key fob, and cause the remotely-controlled door latch to release based on receiving the signal from the sensor and the authentication signal from PEPS system.

8 Claims, 3 Drawing Sheets

(51) Int. Cl.
*E05B 81/78* (2014.01)
*E05F 15/76* (2015.01)
*B60J 5/04* (2006.01)

(56) References Cited

U.S. PATENT DOCUMENTS

| 2017/0057357 | A1 | 3/2017 | Borghi |
| 2018/0038146 | A1 | 2/2018 | Linden et al. |
| 2018/0038147 | A1 | 2/2018 | Linden et al. |
| 2018/0080270 | A1 | 3/2018 | Khan et al. |
| 2018/0216371 | A1 | 8/2018 | Patel et al. |
| 2018/0363354 | A1 | 12/2018 | Linden et al. |
| 2019/0024421 | A1 | 1/2019 | Cumbo |
| 2019/0277071 | A1 | 9/2019 | Sabatini et al. |
| 2019/0346531 | A1 | 11/2019 | Apostolos et al. |
| 2020/0262388 | A1 | 8/2020 | Maddelein et al. |

OTHER PUBLICATIONS

French Preliminary Search Report for French Application No. 19/01700 dated Apr. 29, 2022, 1 page (No English Translation).

German Office Action for German Application No. 2120200005522. 2; dated Oct. 13, 2021; 1 page.

First Chinese Office Action dated Feb. 28, 2022 for Application No. 202090000364.9.

International Search Report for International Application No. PCT/IB2020/000129; Date of Completion: Jun. 29, 2020; dated Jul. 7, 2020; 5 Pages.

Written Opinion for International Application No. PCT/IB2020/000129; International Filing Date: Feb. 14, 2020; dated Jul. 7, 2020; 8 Pages.

HANDLELESS DOOR FOR VEHICLE

CROSS REFERENCE TO RELATED APPLICATIONS

This application is a National Stage of PCT Application No. PCT/IB2020/000129 filed on Feb. 14, 2020, which claims priority to French Patent Application No. 19/01700 filed on Feb. 20, 2019, the contents each of which are incorporated herein by reference thereto.

This application is a National Stage of PCT Application No. PCT/IB2020/000129 filed on Feb. 14, 2020, which claims priority U.S. application Ser. No. 16/277,308 filed on Feb. 15, 2019, the contents each of which are incorporated herein by reference thereto.

BACKGROUND

Exemplary embodiments pertain to the art of vehicles, and more particularly to door entry systems for vehicles.

As automobiles become more homogeneous, automobile designers look for ways to distinguish an automobile from other automobiles in the same category. One way to distinguish an automobile is by its shape. Automobile designers may have a vison of a shape that imparts a certain desired feeling or emotion in a potential buyer. Unfortunately, certain conventional practicalities may get in the way of the vision. For example, various protrusions and/or recesses in an outer envelope of the automobile may be required to accommodate conventional hardware. These protrusions and/or recesses, however, may distort the designer's vision and lead to a design that is similar to other automobiles. Hence, it would be well received by the automotive industry if hardware and methods were developed that would decrease the amount of protrusions and/or recesses in the outer envelope of an automobile.

BRIEF DESCRIPTION

Disclosed is a system for operating a handleless door of an automobile having an outer surface. The system includes: a remotely-controlled door latch disposed at at least one of: flush to the outer surface of the automobile; and interior to the outer surface of the automobile; a sensor at at least one of: disposed behind a window seal; assembled on the window seal; and overmolded in the window seal, the sensor configured to sense an input from a user to open the door, the window seal being configured to transmit an input force to the sensor; an antenna disposed at at least one of: flush to outer surface of the automobile; and interior to the outer surface of the automobile, the antenna configured to receive a radio signal from a key fob in vicinity of the antenna; a passive entry passive start (PEPS) system disposed in the automobile and configured to receive the radio signal from the antenna and to authenticate the key fob as being associated with the automobile; and a controller disposed in the automobile and configured to (i) receive a signal from the sensor indicating the user provided input to open the door, (ii) to receive an authentication signal from the PEPS system to authenticate the key fob as being associated with the automobile, and (iii) cause the remotely-controlled door latch to release based on receiving the signal from the sensor and the authentication signal from PEPS system.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Disclosed are apparatuses and methods for operating a handleless door of an automobile. The term "handleless" relates to the door not having a mechanical outside handle, grip or mechanical trigger that can be grabbed by a person to open the door.

Figure 1:
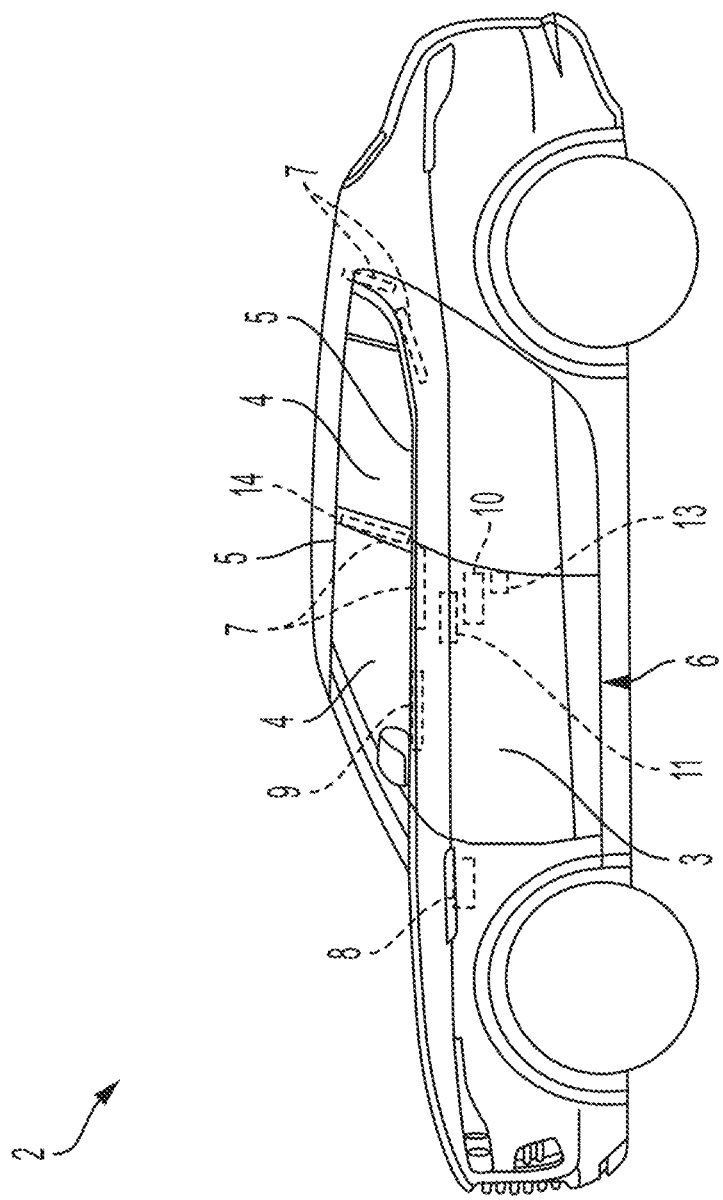
FIG. 1 illustrates a side view of an automobile having a flush body side with handleless door.

FIG. 1 illustrates a side view of an automobile 2 having a handleless door 3, which may simply referred to as the door 3. The door 3 includes a window 4 that is surrounded or partially surrounded by a waist line seal 5. In one or more embodiments, the waist line seal 5 is made of a pliable material such as rubber or a polymer. The door 3, the window 4, and the waist line seal 5 make up an outer surface 6 of the automobile 2. It can be appreciated that while the discussion is based on a front door for teaching purposes, the teachings can apply to any other door in the automobile 2 such as a rear door or a hatchback door.

Disposed interior to or flush to the outer surface 6 is a sensor 7. The sensor 7 is configured to sense an input from a user wanting to gain entry to the automobile 2 by opening the door 3. In one or more embodiments, the sensor 7 is a touch-sensitive switch, which can detect a force imparted on the switch by the user or the presence of a touch by the user. For example, the user can apply a gentle force to the touch-sensitive switch in order to activate the switch. Alternatively, the sensor 7 can be a capacitive sensor or any other mechanical switch that can sense a touch without requiring a certain imparted force. In one or more embodiments, the sensor 7 is disposed behind the waist line seal 5 (or assembled on the waist line seal 5 or overmolded in the waist line seal 5). The waist line seal 5 in a soft material configuration can transmit an input force to the sensor 7. Non-limiting embodiments of a location of the sensor 7 behind the waist line seal 5 includes a lower horizontal section and a vertical section in the A class part in front doors. Alternatively, the sensor 7 can be located at another location such as a B-pillar 14 (inclusive of pillar trim parts) or other pillar even as a buzzle on the door sheet metal.

The automobile 2 also includes a passive entry passive start (PEPS) system 8. The PEPS system 8 is configured to detect a smart-key fob being nearby using a near-field communication (NFC) antenna 9. In one or more embodiments, the NFC antenna 9 may also be located behind the waist line seal 5 such as in the lower horizontal section. Alternatively, the NFC antenna 9 may be located in a rear-view mirror on or near the door 3 or in a rear-view camera system also on or in the Pillar trim part (A, B or C Pillar area) 14 or near the door 3.

The handleless door 3 may include a remotely-controlled door latch 10 that is controlled or operated by a controller 11 in the door 3 or attached to the remotely-operated door latch 10 or in a window regulator motor. The remotely-operated door latch 10 is configured to receive an opening signal from the controller 11 and release the door 3 in response to that signal. In one or more embodiments, the remotely-controlled door latch 10 is electro-mechanically operated in response to receiving an electrical signal that operates a solenoid to release a mechanical latch. The door 3 may be configured to be manually closed by the user such that when the door 3 is shut the latch 10 secures the door 3 closed. The door 3 may also include a door-cinching device 12 configured to automatically cinch the door fully closed when the door 3 is within a pre-defined distance from being fully closed (e.g., from a secondary to a primary position), such as within a few millimeters.

The handleless door 3 may also include a door presenter actuator 13 configured to push the door open a few centimeters after the remotely-operated door latch 10 releases the door 3. In one or more embodiments, the door presenter actuator 13 is configured to receive an extraction signal from the controller 11. The door presenter 13 is electro-mechanically operated in response to receiving an electrical signal that operates a solenoid to push the door open a few centimeters.

Figure 2:
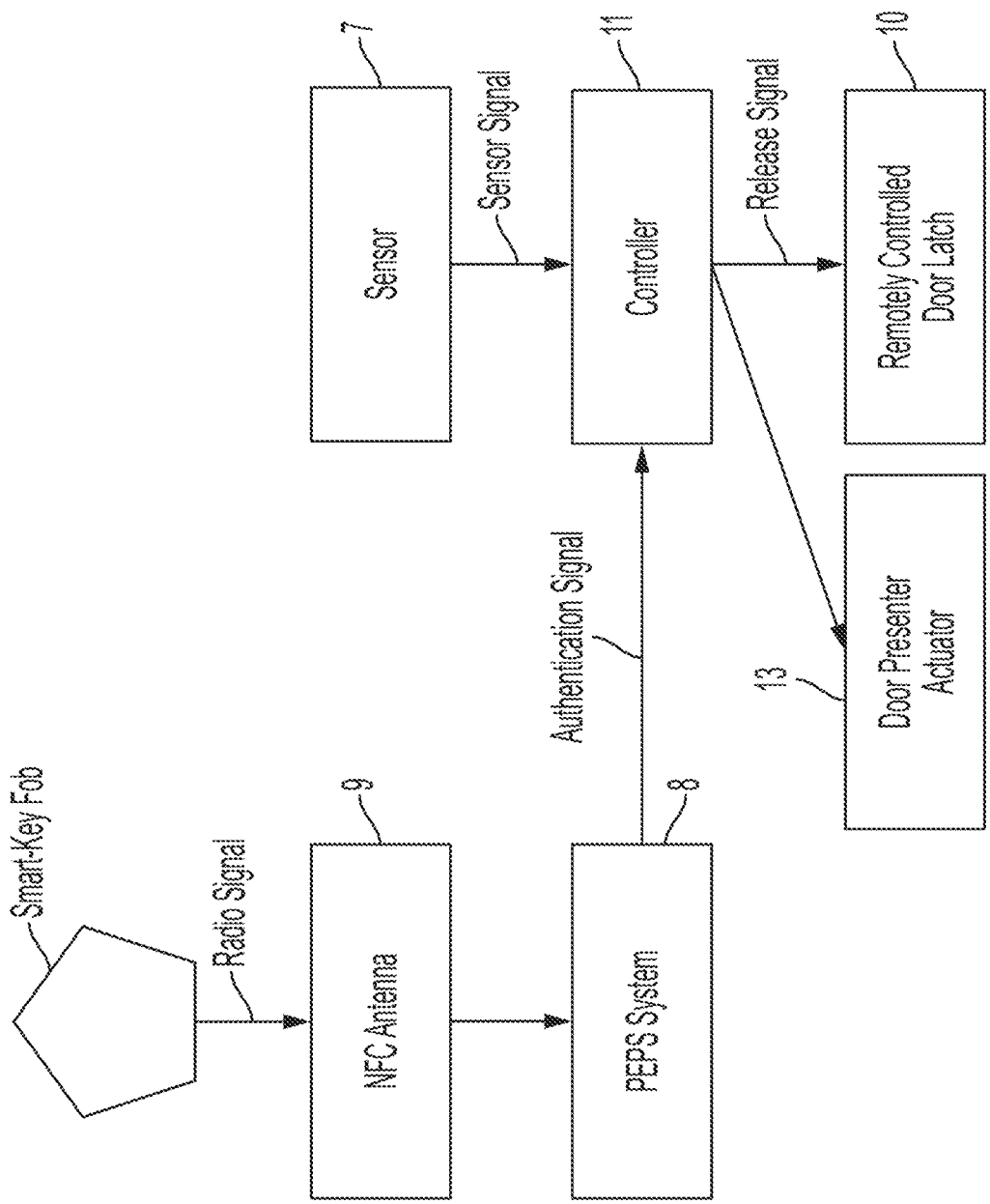
FIG. 2 is a schematic diagram depicting aspects of operation of the handleless door from outside the automobile.

FIG. 2 is a schematic diagram depicting aspects of operation of the handleless door 3 in one embodiment. In block 21, the NFC antenna 9 receives a radio signal from a smart-key fob and the signal is transmitted to the PEPS system 8 at block 22, which authenticates the signal by associating the signal with the specific automobile 2. The PEPS system 8 transmits an authentication signal to the controller 11 informing the controller 11 at block 23 that an authorized user is close to the automobile 2. The sensor 7 at block 24 senses that the authorized user has provided an input to the sensor 7 to have the door 3 open. The controller 11 then receives a signal from the sensor 7 at block 23 informing the controller 11 that the authorized user provided an input to the sensor 7 to open the door 3. Based on the signals received from the PEPS system 8 and the sensor 7, the controller 11 causes the remotely-operated door latch 10 to release the door 3 so that the door 3 can be opened a few centimeters by the door presenter actuator 13.

It can be appreciated that components and/or devices for operating the handleless door 3 may be combined or combined with other automobile systems, components or devices. For example, the controller 11 may be combined with the PEPS system 8 or the door presenter actuator 13 may be combined with the remotely-controlled door latch 10 in non-limiting embodiments.

Figure 3:
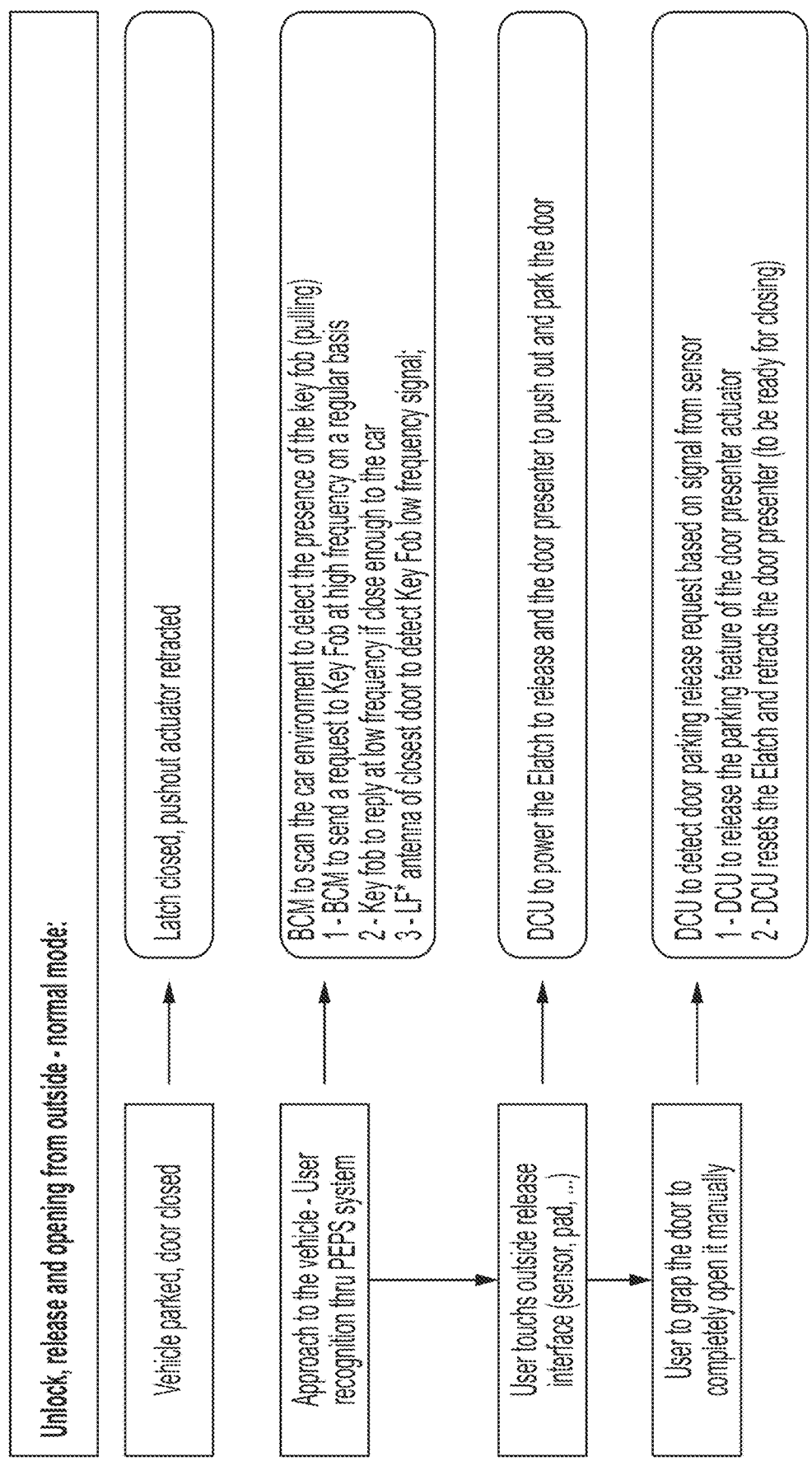
FIG. 3 is a flow chart for a method for opening the handle-less door from outside the automobile.

FIG. 3 is a flow chart depicting aspects of steps for unlocking, releasing, and opening the handleless door 3 from the outside in a normal mode in one embodiment. With reference to FIG. 3, the term "pushout actuator" relates to the door presenter actuator 13. The terms "latch" and "Elatch" refer to the remotely-controlled door latch 10. The term "BCM" relates to a body control module, which is an electronic control unit that may be implemented by the PEPS System 8. The term "DCU" relates to a door control unit that may be implemented by the controller 11.

In one or more embodiments for frameless doors, components used to open the handleless door 3 in the normal mode may be packaged in the trim parts for B and C pillars 14. The NFC antenna and a wake-up switch (for waking up door opening components) may be packaged in a door mirror. The handleless door 3 may be opened directly upon successful recognition using the NFC process for detecting the smart-key fob or upon a second push on the wake-up switch. The door release sensor 7 can be integrated in the waist line window seals if door release from the outside is required after a crash.

Elements of the embodiments have been introduced with either the articles "a" or "an." The articles are intended to mean that there are one or more of the elements. The terms "including" and "having" and the like are intended to be inclusive such that there may be additional elements other than the elements listed. The conjunction "or" when used with a list of at least two terms is intended to mean any term or combination of terms. The term "configured" relates to one or more structural limitations of a device that are required for the device to perform the function or operation for which the device is configured.

The disclosure illustratively disclosed herein may be practiced in the absence of any element which is not specifically disclosed herein.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system for operating a handleless door of an automobile having an outer surface, comprising:
   a remotely-controlled door latch disposed at at least one of: flush to the outer surface of the automobile; and interior to the outer surface of the automobile;
   a sensor disposed behind or overmolded in a window seal, the sensor configured to sense an input from a user to open the door, the window seal being a waist line seal for sealing a window of the handleless door and the waist line seal being configured to transmit an input force to the sensor;
   an antenna disposed behind the waist line seal, the antenna configured to receive a radio signal from a key fob in vicinity of the antenna;
   a passive entry passive start (PEPS) system disposed in the automobile and configured to receive the radio signal from the antenna and to authenticate the key fob as being associated with the automobile; and
   a controller disposed in the automobile and configured to (i) receive a signal from the sensor indicating the user provided input to open the door, (ii) to receive an authentication signal from the PEPS system to authenticate the key fob as being associated with the automobile, and (iii) cause the remotely-controlled door latch to release based on receiving the signal from the sensor and the authentication signal from PEPS system.

2. The system of claim 1, further comprising a door presenter actuator configured to open the door at least a few centimeters upon release of the remotely-controlled door latch.

3. The system of claim 1, further comprising a door-cinching device configured to automatically cinch the handleless door fully closed when the handleless door is within a pre-defined distance from being fully closed, from secondary position to primary position.

4. The system of claim 1, wherein the remotely-operated door latch is an electro-mechanical door latch that is configured to receive a signal from the controller to electro-mechanically release the door.

5. The system of claim 1, wherein the sensor is an electrical switch configured to receive an input from the user to actuate the switch.

6. A method for operating a handleless door of an automobile having an outer surface, comprising:
- receiving an input from a user to open the handleless door using a sensor disposed behind or overmolded in a window seal; and to provide a sensor signal, the window seal being a waist line seal for sealing a window of the handleless door and the waist line seal being configured to transmit an input force to the sensor;
- receiving a radio signal from a key fob using an antenna disposed behind the waist line seal;
- authenticating the key fob using a passive entry passive start (PEPS) system coupled to the antenna to provide an authentication signal, the PEPS system being disposed in the automobile; and
- releasing a remotely-controlled door latch operated by a controller that receives a signal from the sensor indicating the user provided input to open the door and the authentication signal from the PEPS system, the controller being disposed in the automobile.

7. The method of claim 6, further comprising opening the handleless door at least a few centimeters upon release of the remotely-controlled door latch using a door presenter actuator coupled to the handleless door.

8. The method of claim 6, further comprising cinching the handleless door fully shut using a door-cinching device configured to automatically cinch the handleless door fully closed when the handleless door is within a pre-defined distance from being fully closed.

\* \* \* \* \*